US007623705B2

(12) United States Patent
Arazaki (10) Patent No.: US 7,623,705 B2
(45) Date of Patent: Nov. 24, 2009

(54) IMAGE PROCESSING METHOD, IMAGE PROCESSING APPARATUS, AND SEMICONDUCTOR DEVICE USING ONE-DIMENSIONAL FILTERS

(75) Inventor: Shinichi Arazaki, Shimosuwa-machi (JP)

(73) Assignee: Seiko Epson Corporation (JP)

( * ) Notice: Subject to any disclaimer, the term of this patent is extended or adjusted under 35 U.S.C. 154(b) by 797 days.

(21) Appl. No.: 10/983,334

(22) Filed: Nov. 5, 2004

(65) Prior Publication Data
US 2005/0220337 A1    Oct. 6, 2005

(30) Foreign Application Priority Data
Nov. 10, 2003 (JP) .............................. 2003-379509
Aug. 24, 2004 (JP) .............................. 2004-243797

(51) Int. Cl.
*G06K 9/00* (2006.01)

(52) U.S. Cl. ..................................... 382/162

(58) Field of Classification Search ................. 382/162, 382/163, 164, 165, 166, 167; 348/207.99, 348/222.1; 358/500
See application file for complete search history.

(56) References Cited
U.S. PATENT DOCUMENTS 6,441,845 B1 * 8/2002 Matsumoto ................... 348/65
6,678,406 B1 * 1/2004 Mojsilovic et al. .......... 382/162
6,958,772 B1 * 10/2005 Sugimori ................... 348/222.1
7,034,869 B2 * 4/2006 Sugimori ................... 348/222.1
7,116,358 B1 * 10/2006 Sasaki ....................... 348/222.1

FOREIGN PATENT DOCUMENTS

| JP | 11-308625 | 11/1999 |
| JP | 2001-211459 | 8/2001 |
| JP | 2002-077930 | 3/2002 |
| JP | 2003-102025 | 4/2003 |

OTHER PUBLICATIONS

Translation of the Japanese Patent No. 2001-287054, which was included in the IDS.*
Translation of the Japanese Patent No. 2000-254367, which was included in the IDS.*

* cited by examiner

*Primary Examiner*—Samir A. Ahmed
*Assistant Examiner*—Atiba O Fitzpatrick
(74) *Attorney, Agent, or Firm*—Harness, Dickey & Pierce, P.L.C.

(57) ABSTRACT

An image processing method is provided for performing false color reduction processing on a color-difference signal acquired after performing color interpolation processing on image data taken in by a color image pickup sensor, wherein the false color reduction processing uses a one-dimensional filter for selecting N (N≧4) pixels which are continuous in a row direction including a target pixel and determines a pixel value of the target pixel from the pixel values that remain when maximum and minimum pixel values are excluded from the pixel values of the pixels selected by the one-dimensional filter. This enables effective reduction or elimination of a false color generated at an edge part by the color interpolation processing.

12 Claims, 9 Drawing Sheets

IMAGE PROCESSING METHOD, IMAGE PROCESSING APPARATUS, AND SEMICONDUCTOR DEVICE USING ONE-DIMENSIONAL FILTERS

RELATED APPLICATIONS

This application claims priority to Japanese Patent Application No. 2003-379509 filed Nov. 10, 2003, and 2004-243797 filed Aug. 24, 2004 which are hereby expressly incorporated by reference herein in their entirety.

BACKGROUND

1. Technical Field

This invention relates to an image processing apparatus and the like used for a digital camera or the like having a color image pickup sensor such as a CCD or CMOS, and more particularly to an image processing method, an image processing apparatus, an image processing program, and a semiconductor device that are aimed at processing to reduce or eliminate a false color generated by color interpolation processing.

2. Related Art

Generally, color cameras for inputting color images include a three-plate type camera using three image pickup sensors such as a CCD (charge coupled device) or CMOS (complementary metal oxide semiconductor), a single-plate type camera using only one such image pickup sensor, and a two-plate type camera using two such image pickup sensors. The three-plate type color camera is adapted for performing color separation of incident light into the primary colors of red (R), green (G) and blue (B) by dichroic mirrors or the like and converting light information of the separated colors into digital images of red, green and blue by three image pickup sensors. Since the three-plate type color camera can acquire high-quality images, though its optical system has a complicated structure, it is used mainly as a color video camera for professional use, a high-grade digital still camera or the like.

On the other hand, the single-plate type color camera has color filters of red, green and blue arrayed in a block-like manner on one image pickup sensor so as to digitize light information of each pixel transmitted through the corresponding color filters. Since the single-plate type color camera has small size and light weight, consumes less power and is available at a low price, though its image quality is slightly lower than that of the three-plate type color camera, it is mainly used as a private color video camera or digital still camera.

By the way, some private color video cameras employing the three-plate system have been recently commercialized. The two-plate system, which is a system having intermediate characteristics relative to the other two systems, is not used very often at present.

In the single-plate type color camera as described above, because of its structure, color interpolation processing to predictively interpolate a color component that is missing is required. However, this color interpolation processing generates data of a color that does not exist at a target pixel by estimation from pixel values around the target pixel, as will be later described in detail. Therefore, in many cases, an accurate value cannot be calculated at a part where the pixel value changes largely, such as an edge part. Accordingly, a pixel having color balance that is different from the original color balance is generated at the edge part where an accurate value cannot be calculated, and this appears as a false color, which is one of the factors lowering the image quality.

As a technique for reducing such a false color, for example, a technique of inserting an optical low-pass filter (hereinafter simply referred to as "LPF" on suitable occasions) or the like before the image pickup sensor to reduce the false color may be considered. However, this has a disadvantage in that a high spatial frequency component (hereinafter simply referred to as "high-frequency component) is cut by the low-pass filter effect, thus lowering the sharpness or MTF (modulation transfer function or resolution) of the image. Moreover, in this technique, it is difficult to eliminate a false color generated by image processing on the subsequent stage, and to accomplish this purpose, a frequency band ranging to a significantly low frequency component must be cut.

Thus, conventionally, (1) the saturation at the edge part where a false color tends to occur is lowered to make the false color less visible, as disclosed in JP-A-2003-102025, JP-A-11-308625 or the like, and (2) color information is judged more accurately and a color signal that does not generate a false color is generated to restrain the occurrence of the false color, as disclosed in JP-A-2001-211459 or the like. Also, techniques such as (3) calculating peripheral information and selecting a combination of colors that minimizes the saturation so as to make a false color less visible, as disclosed in JP-A-2002-77930 or the like, and (4) calculating a median of color signals including color signals of peripheral parts and eliminating a color that is considered to be a false color so as to reduce the false color, as disclosed in Japanese Patent No. 2,612,850 or the like, have been proposed.

Techniques (1) and (3) of the above-described conventional techniques involve processing to lower the saturation. Since an edge must be determined and the processing is directed to reducing the saturation, the processing is complicated and it is probable that correct information cannot be acquired. That is, data with no color may occur on the periphery of an edge, and in some cases, the original color is not reproduced and may appear like a false color (false contour).

On the other hand, technique (2) can exhibit an excellent false color avoidance effect, but this technique is inconvenient in that very heavy processing such as division for each pixel is required.

Technique (4) is simple because of the idea of processing the value of the difference of color-interpolated data in the target area through the median filter. However, if the processing target area is made two-dimensional or the like and the number of processing target pixels increases, it is probable that the processing becomes heavy.

Another simple technique for avoiding a false color is to process a color component that generates a false color through an LPF and thus disperse the false color generated at an edge part to its periphery so as to reduce the absolute magnitude of the false color and make the false color less visible, as will be described later. However, this technique only disperses the false color component to the periphery and cannot fundamentally eliminate the false color.

Thus, the present invention aims to effectively solve such problems. It is an object of this invention to provide a new image processing method, image processing apparatus, image processing program and semiconductor device that enable easy and effective reduction or elimination of a false color generated at an edge part because of color interpolation processing.

SUMMARY

In order to solve the foregoing problems, an image processing method according to invention 1 is characterized by comprising, after performing color interpolation processing on image data, converting the image data on which the color interpolation processing has been performed to a luminance signal and a color-difference signal, and executing false color reduction processing on the color-difference signal, wherein in the false color reduction processing, N (N≧4) pixels that are continuous in a first direction including a target pixel are selected by a one-dimensional filter, and a pixel value of the target pixel is determined from pixel values that remain when maximum and minimum pixel values are excluded from pixel values of the pixels selected by the one-dimensional filter.

That is, in the image processing method according to this invention, it is assumed that the pixel value of a pixel that generates a false color has a higher degree of coloring than the pixel values of the peripheral pixels, and in order to eliminate the pixel having the higher rate (degree) of coloring, maximum and minimum pixel values, of the group of N pixels that are continuous in the one-dimensional direction (hereinafter also referred to as "scanning direction", "row direction" or "line direction" when necessary) including the target pixel, are eliminated.

Since it can be judged that this rate of coloring increases basically in proportion to the absolute value of the value of the color-difference (C) signal, the pixel value is judged from the value of the color-difference (C) signal acquired by the YC conversion of the color-interpolated image data into luminance and color-difference signals.

This enables easy and effective reduction or elimination of a false color generated particularly at an edge part (part where the pixel value largely varies between adjacent pixels) because of color interpolation processing.

The "image data" in this invention refers to color image data in which each pixel lacks a part of color information, like image data acquired directly from a single-plate type color image pickup sensor before the color interpolation processing, and after the color interpolation processing, it refers to color image data in which the lacking color information has been provided by the color interpolation processing. For example, before the color interpolation processing, it is color image data having color information of only one or two colors of RGB or CMYG for one pixel (in the case of CMYG, three colors or less), and after the color interpolation processing, it is color image data having all the colors of RGB or CMYG for each pixel acquired through the color interpolation processing. (This also applies to the following image processing method, image processing apparatus, image processing program and semiconductor device.)

The "false color reduction processing" includes reduction in the degree of a false color generated at pixels constituting an image, for each pixel, as well as reduction in the number of pixels that generate a false color. (This also applies to the following image processing method, image processing apparatus, image processing program and semiconductor device.)

The "pixel value" refers to a value of a color-difference signal acquired by converting image data (expressed by luminance value or density value) on which the color interpolation processing has been performed to a luminance signal and a color-difference signal. For example, when it is expressed by eight bits, it is a numerical value expressed within a range of "0 to 255" or "−128 to 127". (This also applies to the following image processing method, image processing apparatus, image processing program and semiconductor device.)

The color interpolation processing according to the method of this invention is necessary primarily for image data having color information of only one color at each pixel, like image data acquired from a single-plate type color image pickup sensor. However, even in the case of image data acquired from a three-plate type color image pickup sensor or a two-plate type color image pickup sensor, the color interpolation processing is necessary if the image data lacks color information. (This also applies to the image processing method, image processing apparatus, image processing program and semiconductor device.)

An image processing method according to invention 2 is characterized in that, in the image processing method described in the invention 1, the pixel value of the target pixel is an average value of the pixel values that remain when the maximum and minimum pixel values are excluded from the pixel values of the pixels selected by the one-dimensional filter.

That is, as a specific technique for determining the pixel value of the target pixel from the pixel values that remain when the maximum and minimum pixel values are excluded, the average value of the remaining pixel values is employed.

As the average value of the pixel values that remain when the maximum and minimum pixel values are excluded is thus determined as the pixel value of the target pixel, it is possible to reduce a false color that could not be eliminated by an operation of excluding the maximum and minimum values with respect to the false color generated with a small value in a broad range. Since this enables acquisition of a pixel value close to the original pixel value, it is possible to effectively reduce or eliminate the false color.

An image processing method according to invention 3 is characterized by comprising, after performing color interpolation processing on image data, converting the image data on which the color interpolation processing has been performed to a luminance signal and a color-difference signal, and executing false color reduction processing on the color-difference signal, wherein in the false color reduction processing, plural pixels including a target pixel are selected by a two-dimensional filter, and a pixel value of the target pixel is determined from pixel values that remain when maximum and minimum pixel values are excluded from pixel values of the pixels selected by the two-dimensional filter for each one-dimensional filter constituting the two-dimensional filter, and the two-dimensional filter includes M (M≧3) one-dimensional filters, each for selecting N (N≧4) pixels that are continuous in a first direction, the M one-dimensional filters being arrayed in a direction orthogonal to the first direction.

That is, in contrast to the image processing method according to invention 1 using a single one-dimensional filter along a general scanning direction for the false color reduction processing, by using the M stages of two-dimensional filters having plural one-dimensional filters vertically stacked (N×M) as in invention 3, it is possible to effectively reduce not only a false color in the row direction but also a false color in the column direction.

An image processing method according to invention 4 is characterized in that, in the image processing method described in invention 3, the pixel value of the target pixel is determined from average values that remain when maximum and minimum average values are excluded from average values of the pixel values from each one-dimensional filter constituting the two-dimensional filter.

Invention 4 specifies a technique for determining the pixel value of the target pixel in the case of using the two-dimensional filter as in invention 3. By determining the pixel value of the target pixel from the average values that remain when the maximum and minimum average values having a large influence on the occurrence of a false color are excluded, it is possible to reduce the occurrence of the false color more effectively.

An image processing method according to invention 5 is characterized in that, in the image processing method described in invention 3, the pixel value of the target pixel is determined from an average value of average values that remain when maximum and minimum average values are excluded from average values of the pixel values from each one-dimensional filter constituting the two-dimensional filter.

Invention 5 further specifies a technique for determining the pixel value of the target pixel in the case of using the two-dimensional filter as in invention 4. By excluding the maximum and minimum average values having a large influence on the occurrence of a false color and taking the average value of the remaining average values as the pixel value of the target pixel from the two-dimensional filter, it is possible to reduce or eliminate a false color that could not be eliminated simply by an operation of excluding the maximum and minimum values with respect to the false color generated with a small value in a broad range, both in the row direction and in the column direction.

In particular, by using the method according to invention 5, it is possible to effectively reduce or eliminate a false color that occurs continuously in both vertical and horizontal lines and thus becomes very visible.

An image processing method according to invention 6 is characterized in that, in the image processing method described in invention 4, the pixel value of the target pixel is a median of the average values of the pixel values from each one-dimensional filter constituting the two-dimensional filter.

Invention 6 further specifies a technique for determining the pixel value of the target pixel in the case of using the two-dimensional filter as in invention 4. By taking the median, of the average values of the pixel values from each one-dimensional filter constituting the two-dimensional filter as the pixel value of the target pixel from the two-dimensional filter, it is possible to reduce or eliminate a false color more effectively.

In particular, by using the method according to invention 6, it is possible to effectively reduce or eliminate a false color that occurs continuously in both vertical and horizontal lines.

An image processing method according to invention 7 is characterized in that, in the image processing method in one of inventions 1 to 6, the target pixel is a pixel situated at the center of the one-dimensional filters.

By thus selecting the pixel situated at the center of the one-dimensional filters as the target pixel from the pixels selected by the one-dimensional filters, it is possible to perform uniform false color reduction processing in relation with the pixel values of the peripheral pixels.

An image processing method according to invention 8 is characterized in that, in the image processing method in one of inventions 1 to 7, the false color reduction processing is carried out about an edge part of the image data.

The occurrence of this false color concentrates at an edge part where the density of color changes more largely than in a flat part having less color change, as described above. Therefore, by extracting an edge part where a false color tends to occur from the image and carrying out the processing about the edge part as in invention 8, the time required for the false color reduction processing may be reduced compared with the technique of carrying out the processing on the entire image (all the pixels), though it depends largely on the type of image. Particularly in the case of carrying out invention 8 not by hardware but by software, the image processing time or the like generally takes longer than the hardware implementation. Therefore, employing the method according to invention 8 can achieve outstanding effects.

An image processing method according to invention 9 is characterized in that, in the image processing method in one of inventions 1 to 8, a single-plate type color image pickup sensor is used as the color image pickup sensor.

That is, as described in invention 1, though the color interpolation processing according to the method of invention 9 may be necessary in the case of using a three-plate type color image pickup sensor or a two-plate type color image pickup sensor, in practice, the color interpolation processing is necessary mostly in the case of using a single-plate type color image pickup sensor. Therefore, by using the method according to inventions 1 to 8 in the case of using the single-plate type color image pickup sensor, it is possible to exhibit a more outstanding false color reduction effect.

An image processing apparatus according to invention 10 is an image processing apparatus for performing predetermined image processing on an image taken in by a color image pickup sensor and outputting the resulting image, characterized by comprising at least a color interpolation processing unit for carrying out color interpolation processing on the image taken in by the image pickup sensor, a YC converter unit for converting the image data on which the color interpolation processing has been performed by the color interpolation processing unit to a luminance signal and a color-difference signal, a false color reduction processing unit for selecting, by a one-dimensional filter, N (N≧4) pixels that are continuous in a first direction including a target pixel with respect to the color-difference signal acquired by the conversion by the YC converter unit and determining a pixel value of the target pixel from pixel values that remain when maximum and minimum pixel values are excluded from pixel values of the pixels selected by the one-dimensional filter, and an RGB converter unit for combining the color-difference signal processed by the false color reduction processing unit and the luminance signal, performing RGB conversion, and sending the resulting image data to an image output unit.

Thus, after the color interpolation processing and the YC conversion are performed almost at the same time as the color image pickup sensor takes in the image, false color reduction processing similar to the processing in invention 1 is automatically performed on the color-difference signal. Therefore, a false color generated at an edge part because of the color interpolation processing by the color interpolation unit is effectively reduced and a beautiful image with no false color can be generated and outputted.

An image processing apparatus according to invention 11 is characterized in that, in the image processing apparatus described in invention 10, the pixel value of the target pixel is an average value of the pixel values that remain when the maximum and minimum pixel values are excluded from the pixel values of the pixels selected by the one-dimensional filter.

Since this enables acquisition of a pixel value close to the original pixel value, as in invention 2, it is possible to effectively reduce or eliminate the false color.

An image processing apparatus according to invention 12 is an image processing apparatus for performing predetermined image processing on an image taken in by a color image pickup sensor and outputting the resulting image, characterized by comprising a color interpolation processing unit for carrying out color interpolation processing on the image taken in by the image pickup sensor, a YC converter unit for converting the image data on which the color interpolation processing has been performed by the color interpolation processing unit to a luminance signal and a color-difference signal, a false color reduction processing unit for selecting, by a two-dimensional filter, plural pixels including a target pixel with respect to the color-difference signal acquired by the conversion by the YC converter unit and determining a pixel value of the target pixel from pixel values that remain when maximum and minimum pixel values are excluded from pixel values of the pixels selected by the two-dimensional filter for each one-dimensional filter constituting the two-dimensional filter, and an RGB converter unit for combining the color-difference signal processed by the false color reduction processing unit and the luminance signal, performing RGB conversion, and sending the resulting image data to an image output unit, wherein the two-dimensional filter includes M ($M \geq 3$) one-dimensional filters, each for selecting N ($N \geq 4$) pixels that are continuous in a first direction including the target pixel, the M one-dimensional filters being arrayed in a direction orthogonal to the first direction.

This makes it possible to effectively reduce not only a false color in the row direction but also a false color in the column direction, as in invention 3.

An image processing apparatus according to invention 13 is characterized in that, in the image processing apparatus described in invention 12, the false color reduction processing unit determines the pixel value of the target pixel from average values that remain when maximum and minimum average values are excluded from average values of the pixel values from each one-dimensional filter constituting the two-dimensional filter.

This makes it possible to reduce the occurrence of the false color more effectively, as in invention 4.

An image processing apparatus according to invention 14 is characterized in that, in the image processing apparatus described in invention 12, the false color reduction processing unit determines the pixel value of the target pixel from an average value of average values that remain when maximum and minimum average values are excluded from average values of the pixel values from each one-dimensional filter constituting the two-dimensional filter.

This makes it possible to reduce or eliminate a false color that could not be eliminated simply by an operation of excluding the maximum and minimum values with respect to the false color generated with a small value in a broad range, both in the row direction and in the column direction, as in invention 5. Moreover, it is possible to effectively reduce or eliminate an outstanding false color that occurs continuously in both vertical and horizontal lines and thus becomes very visible.

An image processing apparatus according to invention 15 is characterized in that, in the image processing apparatus described in invention 13, the false color reduction processing unit takes a median of the average values of the pixel values from each one-dimensional filter constituting the two-dimensional filter, as the pixel value of the target pixel.

This makes it possible to reduce or eliminate a false color more effectively, as in invention 6.

An image processing apparatus according to invention 16 is characterized in that, in the image processing apparatus in one of inventions 10 to 15, the false color reduction processing unit determines a pixel situated at the center of the one-dimensional filters as the target pixel.

This makes it possible to perform uniform false color reduction processing between the pixel values of the target pixel and the peripheral pixels, as in invention 7.

An image processing apparatus according to invention 17 is characterized in that, in the image processing apparatus in one of inventions 10 to 16, the false color reduction processing unit carries out the processing about an edge part of the image data.

Thus, as in invention 8, the time required for the false color reduction processing may be reduced compared with the case of carrying out the processing on the entire image (all the pixels).

An image processing apparatus according to invention 18 is characterized in that, in the image processing apparatus described in invention 16, the color image pickup sensor is a single-plate type color image pickup sensor.

Thus, a particularly outstanding false color reduction effect can be exhibited in the case of employing a single-plate type color image sensor, as in invention 9.

An image processing program according to invention 19 is an image processing program for performing predetermined image processing on an image taken in by a color image pickup sensor and outputting the resulting image, characterized by causing a computer to execute a color interpolation processing step of carrying out color interpolation processing on the image taken in by the image pickup sensor, a YC conversion step of converting the image data on which the color interpolation processing has been performed at the color interpolation processing step to a luminance signal and a color-difference signal, a false color reduction processing step of selecting, by a one-dimensional filter, N ($N \geq 4$) pixels that are continuous in a first direction including a target pixel with respect to the color-difference signal acquired by the conversion at the YC conversion step and determining a pixel value of the target pixel from pixel values that remain when maximum and minimum pixel values are excluded from pixel values of the pixels selected by the one-dimensional filter, and an RGB conversion step of combining the color-difference signal processed at the false color reduction processing step and the luminance signal, performing RGB conversion, and sending the resulting image data to an image output unit.

Thus, not only effects similar to those of inventions 1, 10 and the like can be achieved, but also the program can be realized on software not only by using a dedicated computer system but also by using a general-purpose computer system such as a personal computer (PC). Therefore, its function can be realized economically and easily, compared with the case of preparing dedicated hardware to realize the function. Moreover, the function can be easily modified simply by rewriting the program.

An image processing program according to invention 20 is an image processing program for performing predetermined image processing on an image taken in by a color image pickup sensor and outputting the resulting image, characterized by causing a computer to execute a color interpolation processing step of carrying out color interpolation processing on the image taken in by the image pickup sensor, a YC conversion step of converting the image data on which the color interpolation processing has been performed at the color interpolation processing step to a luminance signal and a color-difference signal, a false color reduction processing step of selecting plural pixels including a target pixel with respect to the color-difference signal acquired by the conversion at the YC conversion step, by a two-dimensional filter (the two-dimensional filter including M ($M \geq 3$) one-dimensional filters, each for selecting N ($N \geq 4$) pixels that are continuous in a first direction including the target pixel, the M one-dimensional filters being arrayed in a direction orthogonal to the first direction), and determining a pixel value of the target pixel from pixel values that remain when maximum and minimum pixel values are excluded from pixel values of the pixels selected by the two-dimensional filter for each one-dimensional filter constituting the two-dimensional filter, and an RGB conversion step of combining the color-difference signal processed at the false color reduction processing step and the luminance signal, performing RGB conversion, and sending the resulting image data to an image output unit.

Thus, not only effects similar to those of inventions 3, 12 and the like can be achieved, but also the program can be realized on software not only by using a dedicated computer system but also by using a general-purpose computer system such as a personal computer (PC), as in invention 19. Therefore, its function can be realized economically and easily, compared with the case of preparing dedicated hardware to realize the function. Moreover, the function can be easily modified simply by rewriting the program.

A semiconductor device according to invention 21 is a semiconductor device for image processing for performing predetermined image processing on an image taken in by a color image pickup sensor and outputting the resulting image, characterized by comprising a color interpolation processing unit for carrying out color interpolation processing on the image taken in by the image pickup sensor, a YC converter unit for converting the image data on which the color interpolation processing has been performed by the color interpolation processing unit to a luminance signal and a color-difference signal, a false color reduction processing unit for selecting, by a one-dimensional filter, N (N≧4) pixels that are continuous in a first direction including a target pixel with respect to the color-difference signal acquired by the conversion by the YC converter unit and determining a pixel value of the target pixel from pixel values that remain when maximum and minimum pixel values are excluded from pixel values of the pixels selected by the one-dimensional filter, and an RGB converter unit for combining the color-difference signal processed by the false color reduction processing unit and the luminance signal, performing RGB conversion, and sending the resulting image data to an image output unit.

Thus, not only effects similar to those of inventions 1, 10 and the like can be achieved, but also an image processing function similar to that of inventions 1, 10 and the like can be provided in a small-sized integrated circuit such as an IC or LSI. Therefore, the semiconductor device can be easily loaded on a portable small camera such as a digital camera or digital video camera and can be utilized for a part of the image processing.

A semiconductor device according to invention 22 is a semiconductor device for performing predetermined image processing on an image taken in by a color image pickup sensor and outputting the resulting image, characterized by comprising a color interpolation processing unit for carrying out color interpolation processing on the image taken in by the image pickup sensor, a YC converter unit for converting the image data on which the color interpolation processing has been performed by the color interpolation processing unit to a luminance signal and a color-difference signal, a false color reduction processing unit for selecting, by a two-dimensional filter, N (N≧4) pixels that are continuous in a one-dimensional direction including a target pixel with respect to the color-difference signal acquired by the conversion by the YC converter unit and determining a pixel value of the target pixel from pixel values that remain when maximum and minimum pixel values are excluded from pixel values of the pixels selected by the two-dimensional filter for each one-dimensional filter constituting the two-dimensional filter, and an RGB converter unit for combining the color-difference signal processed by the false color reduction processing unit and the luminance signal, performing RGB conversion, and sending the resulting image data to an image output unit, wherein the two-dimensional filter includes M (M≧3) one-dimensional filters, each for selecting N (N≧4) pixels that are continuous in a first direction including the target pixel, the M one-dimensional filters being arrayed in a direction orthogonal to the first direction.

Thus, not only effects similar to those of inventions 3, 12 and the like can be achieved, but also an image processing function similar to that of inventions 1, 10 and the like can be provided in a small-sized integrated circuit such as an IC or LSI. Therefore, the semiconductor device can be easily loaded on a portable small camera such as a digital camera or digital video camera and can be utilized for a part of the image processing.

DETAILED DESCRIPTION

Hereinafter, the best mode for carrying out this invention will be described in detail with reference to the accompanying drawings.

Figure 1:
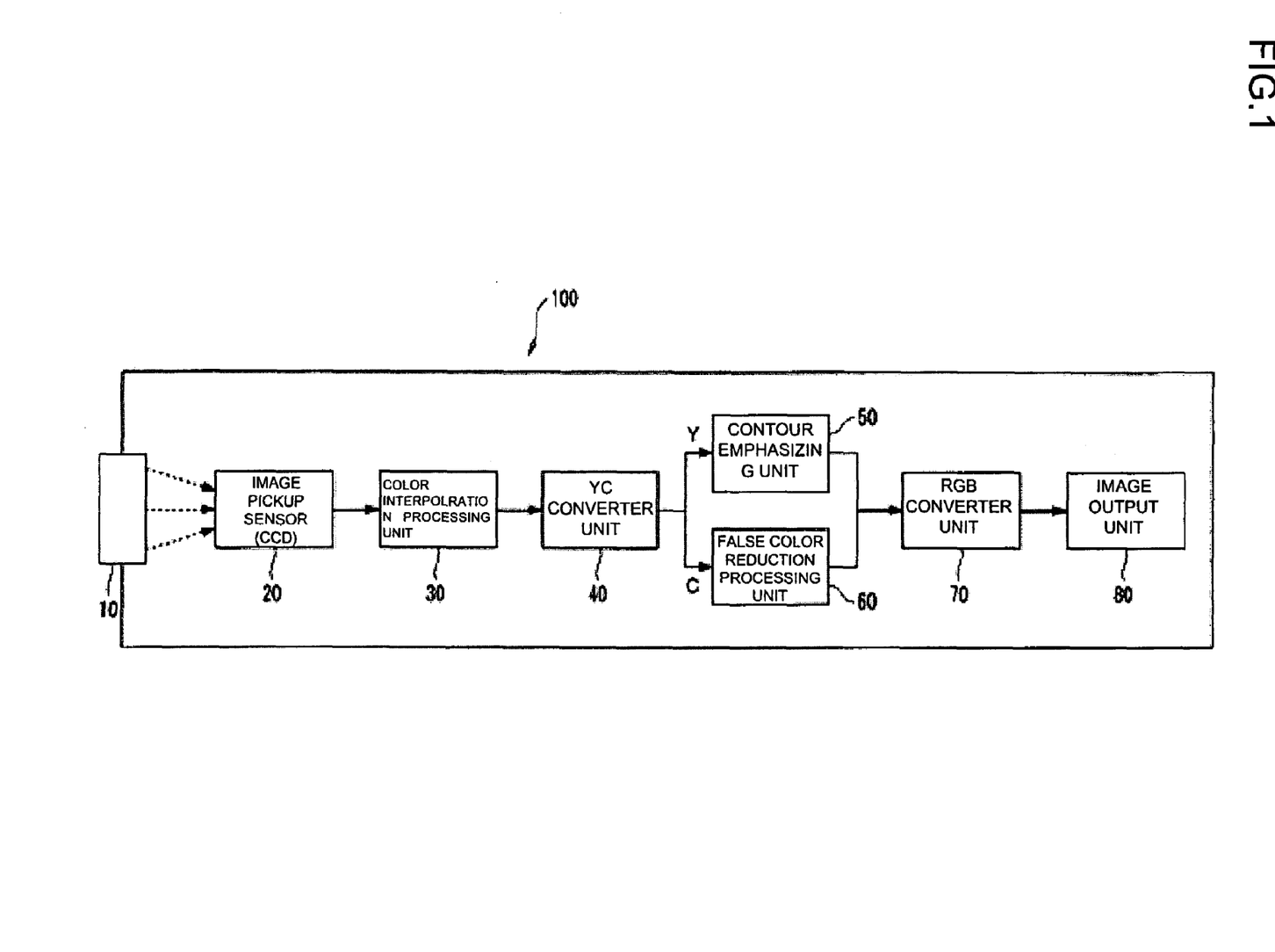
FIG. 1 is a block diagram showing an embodiment of an image processing apparatus according to this invention.

FIG. 1 shows an embodiment of an image processing apparatus 100 according to this invention.

As shown in FIG. 1, this image processing apparatus 100 is mainly constituted by a camera lens (hereinafter simply referred to as "lens") 10 for catching an arbitrary object, a single-plate type color image pickup sensor 20 for taking in an image passed through this lens 10, a color interpolation processing unit 30 for performing color interpolation processing on the image taken in by this color image pickup sensor 20, a YC converter unit 40 for separating the RGB data on which the color interpolation processing has been performed by this color interpolation processing unit 30 into a luminance component (Y) and color-difference components (Cb, Cr), a contour emphasizing unit 50 for compensating or emphasizing contour information of an edge part or the like of the image that is lost, again, at the color interpolation processing unit 30 and thus sharpening the image, a false color reduction processing unit 60 for eliminating a false color generated by the color interpolation processing with respect to the color-difference components C, an RGB converter unit 70 for converting the YC signal separated into the luminance component (Y) and color-difference components (Cb, Cr) to an RGB signal, and an image output unit 80 for visually outputting the image data after the RGB signal is restored.

Here, for all of the lens 10, the color image pickup sensor 20, the color interpolation processing unit 30, the YC converter unit 40, the contour emphasizing unit 50, the RGB converter unit 70 and the image output unit 80, elements and units similar to conventional ones can be fundamentally applied as they are. The false color reduction processing unit 60 particularly constitutes a characteristic part of this invention.

That is, this false color reduction processing unit 60 provides the function of reducing or eliminating a false color generated at an edge part of an image by the color interpolation processing, by using a dedicated filter (operator) to decide a pixel value of a target pixel from pixel values that remain when maximum and minimum pixel values are excluded from a group of serial pixels including the target pixel, which is a processing target, as will be later described in detail.

Here, typical color interpolation processing at the color interpolation processing unit 30, which is a cause of the false color reduction processing according to this invention, will be described rather in detail with reference to FIGS. 4 to 6.

The color interpolation processing at this color interpolation processing unit 30 is the processing to predictively interpolate missing color information for each pixel from neighboring pixels of the same color, of image data picked up by the color image pickup sensor 20 or the like such as a single-plate type CCD as described above, and thus restore primary color signals of RGB (if the color filter is of CMYG, primary color signals of CMYG) for each pixel.

Figure 4:
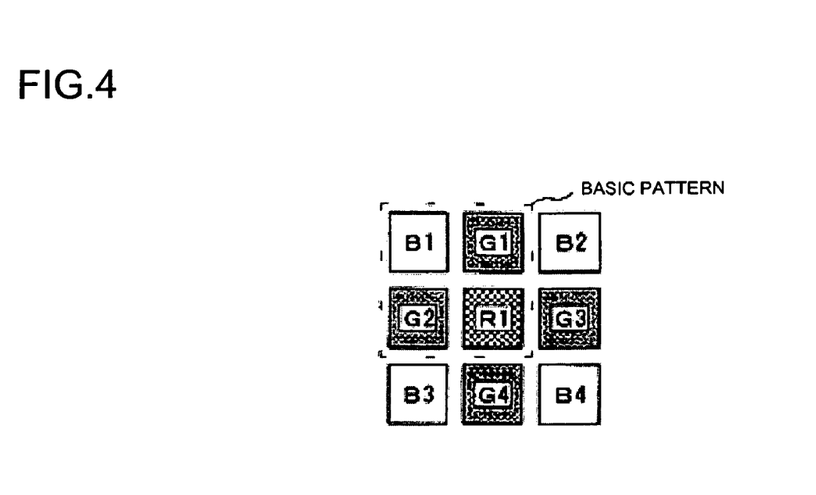
FIG. 4 is a view showing an example of color filter arrangement pattern.

For example, if color filters of red, green and blue arrayed in a block-like form and mounted on a single-plate type CCD are arranged in a basic pattern made up of one B (blue) filter, one R (red) filter and two G (green) filters that are arranged in a matrix form as shown in FIG. 4 and a target pixel to be a target of the color interpolation processing is a pixel "R1" situated at the center in FIG. 4, only color information about "red" exists at the pixel equivalent to this target pixel "R1".

Figure 5:
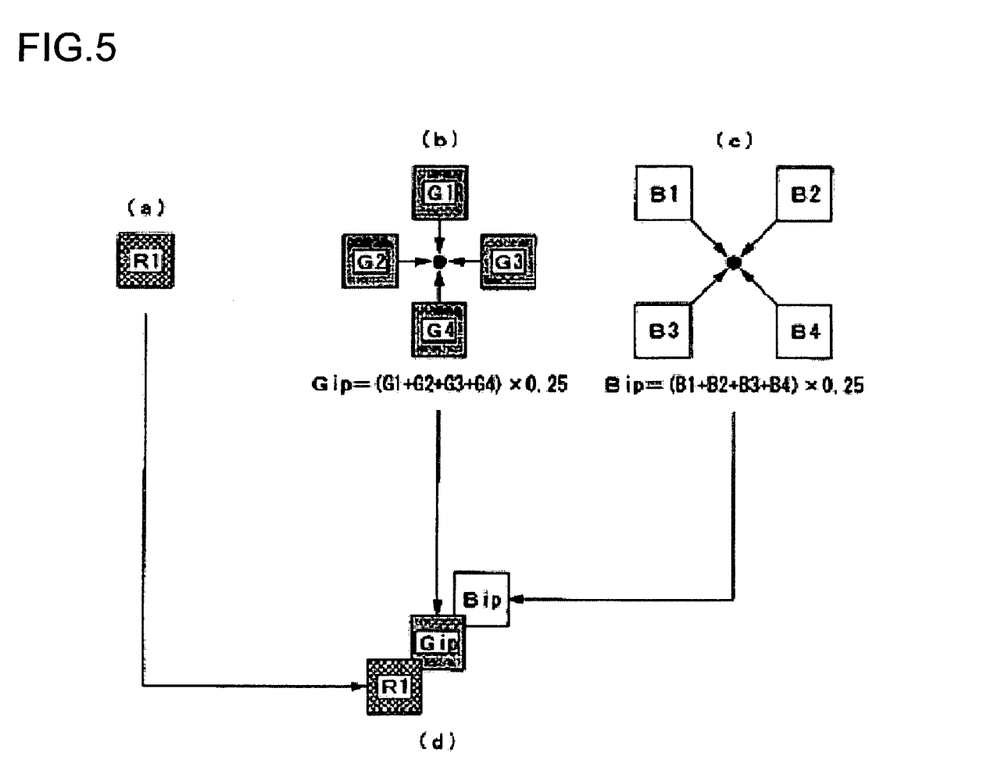
FIG. 5 is an explanatory view showing an example of color interpolation processing.

Therefore, as shown in FIG. 5 at (a), the color information about "red" for the target pixel "R1" is employed as it is. However, as to color information (Gip) about "green", an average value of color information about "green" of pixels in the peripheral area surrounding the target pixel "R1" is found, as shown in FIG. 5 at (b). That is, the color information (Gip) about "green" of the target pixel "R1" is predictively interpolated by finding pixel values about "green" of four pixels "G1", "G4", "G2" and "G3" situated above, below, and left and right sides of the target pixel "R1" and then calculating the average value of these pixel values ((G1+G4+G2+G3)×0.25).

Similarly, as to color information (Bip) about "blue" of the target pixel "R1", an average value of color information about "blue" of pixels in the peripheral area surrounding the target pixel "R1" is found, as shown in FIG. 5 at (c). That is, the color information (Bip) about "blue" of the target pixel "R1" is predictively interpolated by finding pixel values about "blue" of four pixels "B1", "B4", "B2" and "B3" situated obliquely above and below and obliquely left and right sides of the target pixel "R1" and then calculating the average value of these pixel values ((B1+B4+B2+B3)×0.25).

Then, as such color interpolation processing is performed sequentially on all the pixels or in parallel on plural areas obtained by dividing the pixels, missing color components for each pixel are predictively interpolated to regenerate the original color of the image.

Therefore, in such color interpolation processing, since data of a color that does not exist at a particular pixel is generated by estimation, a correct value cannot be calculated and a pixel having color balance different from the original color balance tends to be generated at a part where the pixel value changes largely, for example, an edge part or the like, and this causes appearance of a false color at the edge part or the like.

Figure 6:
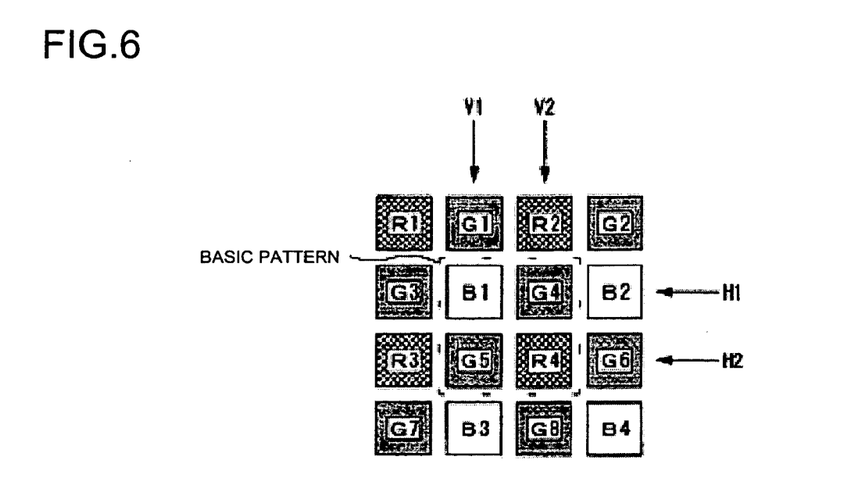
FIG. 6 is a view showing an example of color filter arrangement pattern.

FIG. 6 shows a typical color arrangement pattern of color filters mounted on a single-plate type image pickup sensor. Particularly, in the case of color interpolation processing on each of four pixels "B1", "G4", "G5" and "R4" constituting a basic pattern situated at the center in FIG. 6, the processing is performed by the following techniques 1 to 4.

1. Gip and Rip of pixel B1 at (V1, H1)
  Rip=(R1+R2+R3+R4)×0.25
  Gip=(G1+G3+G4+G5)×0.25
  Bip=B1
  2. Bip and Rip of pixel G4 at (V2, H1)
  Rip=(R2+R4)×0.5
  Gip=G4
  (or Gip=G4×0.5+(G1+G2+G5+G6)×0.125)
  Bip=(B1+B2)×0.5
  3. Bip and Rip of pixel G5 at (V1, H2)
  Rip=(R3+R4)×0.5
  Gip=G5
  (or Gip=G5×0.5+(G3+G4+G7+G8)×0.125)
  Bip=(B1+B3)×0.5
  4. Gip and Bip of pixel R4 at (V2, H2)
  Rip=R4
  Gip=(G4+G5+G6+G8)×0.25
  Bip=(B1+B2+B3+B4)×0.25

The processing functions of the color interpolation processing unit 30, the YC converter unit 40, the contour emphasizing unit 50, the false color reduction processing unit 60, the RGB converter unit 70 and the like constituting this image processing apparatus 100 are realized by a computer system including hardware, specifically, a central processing unit, a main storage and the like, and various dedicated software (processing programs) manufactured for image processing.

Figure 2:
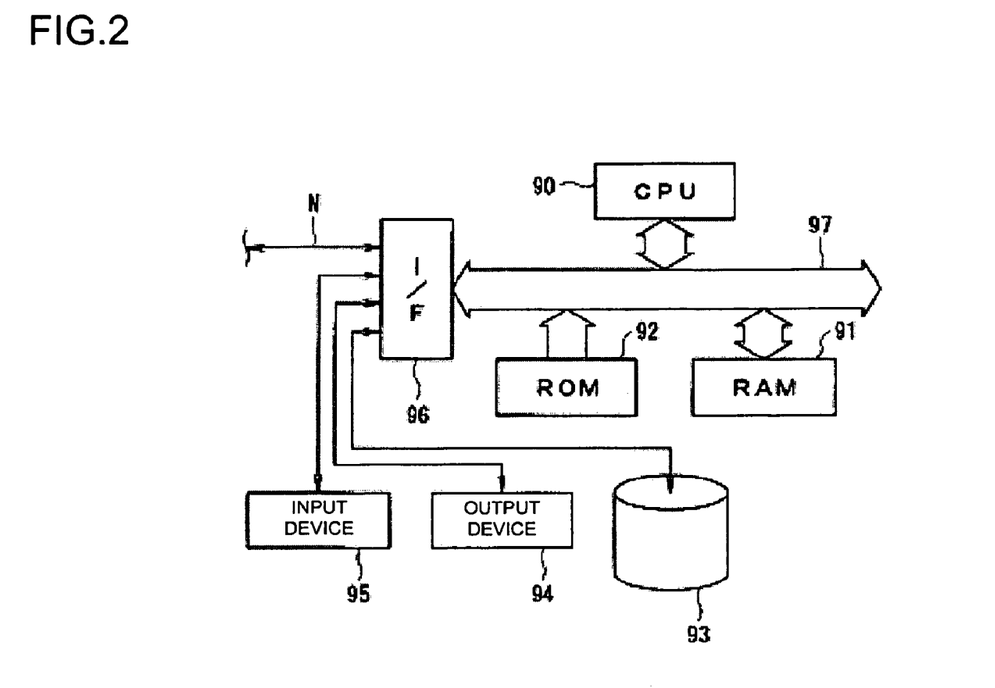
FIG. 2 is a block diagram showing a hardware structure for realizing the image processing apparatus.

That is, in the computer system for realizing this image processing apparatus 100, for example, as shown in FIG. 2, a CPU (central processing unit) 90, which is a central processing unit responsible for various controls and arithmetic processing, a RAM (random access memory) 91 used for a main storage, a ROM (read-only memory) 92, which is a read-only storage device, a secondary storage 93 such as a hard disk drive (HDD) or semiconductor memory, an output device 94 and an input device 95 such as a monitor (LCD, i.e., liquid crystal display) or CRT (cathode ray tube) (i.e., in this invention, color image pickup sensor 20), and an input/output interface (I/F) 96 between these devices are connected by various inner/outer buses 97 such as a processor bus, memory bus, system bus and input/output bus made up of PCI (peripheral component interconnect) bus, ISA (industrial standard architecture) bus and the like. Then, various control programs and data supplied through a storage medium such as a CD-ROM, DVD-ROM or floppy (trademark registered) disk or through a communication network (LAN, WAN, Internet or the like) N are installed into the secondary storage 93. The programs and data are loaded to the main storage 91, when necessary, and the CPU 90 performs predetermined control and arithmetic processing by utilizing various resources in accordance with the programs loaded to the main storage 91. The result of the processing (processing data) is outputted to the output device 94 via the bus 97 for display and the data is properly stored or saved (updated) into a database formed by the secondary storage 93, when necessary.

For this color image pickup sensor 20, an image pickup sensor such as a CCD (charge couple device) or CMOS (complementary metal oxide semiconductor) is employed as it is, as in the conventional technique. Although a single-plate type image pickup sensor exhibits particularly outstanding effects, not only the single-plate type but also the three-plate type and two-plate type may also be employed.

The image output unit 80, if simply put, visually displays images before and after processing. It includes soft a copy device such as a CRT or LCD and a hard copy device such as a laser printer or ink jet printer, and also includes a circuit (board) or the like dedicated to image output such as a so-called graphic accelerator or video card.

The image processing apparatus using this color image pickup sensor 20 may also need a block for controlling the color image pickup sensor 20 and the like (for example, exposure control and the like) and a block for processing colors (for example, automatic white balance). However, since these blocks take little part in the present invention and the conventional techniques can be used to constitute these blocks, the description of these blocks will not be given in this embodiment.

The units 10, 20, 30, 40, 50, 60, 70 and 80 may be integrally housed in one casing, as in a portable digital camera or hand held video camera. Alternatively, a part of these units, for example, only the image output unit 80 made up of a liquid crystal monitor or the like, may be physically independent.

Hereinafter, the image processing method according to this invention will be described.

Figure 3:
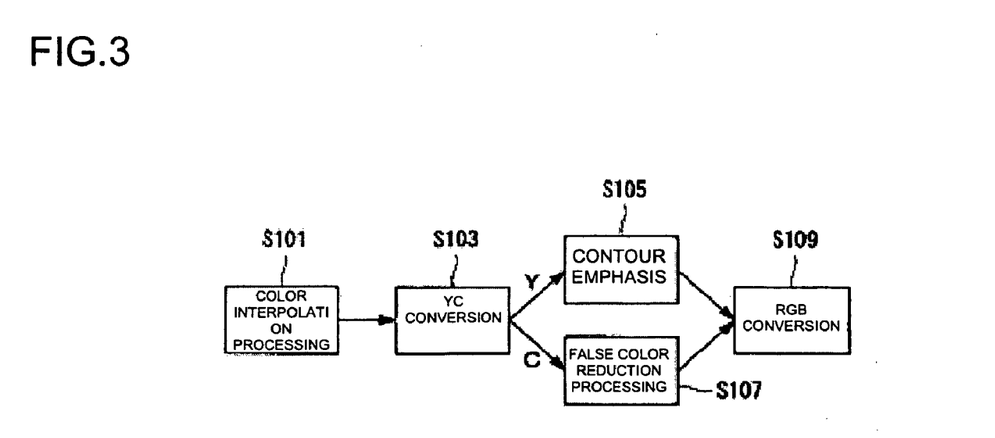
FIG. 3 is a block diagram showing a flow from color interpolation processing to image output.

First, image data taken in by the single-plate type color image pickup sensor 20 is subjected to noise removal processing, gain adjustment processing for adjusting the brightness and the like, which are proper to the sensor, and is then A/D-converted. After that, as shown in FIG. 3, the image data is sent to the color interpolation processing unit 30 and color interpolation processing as described above is performed on all the pixels by this color interpolation processing unit 30 (step S101). Then, the image data is sent to the YC converter unit 40, where it is converted into a luminance signal (Y) and a color-difference signal (C) (step S103).

Next, of the luminance signal (Y) and the color-difference signal (C) separated by this YC converter unit 40, the luminance signal (Y) is sent to the contour emphasizing unit 50 and high-pass filtering (with a high-frequency emphasizing filter, hereinafter simply referred to as "HPF" on proper occasions) is performed on the luminance signal (Y) by this contour emphasizing unit 50. Thus, an edge part of the luminance image dulled by the color interpolation processing is sharpened and the contour is compensated and emphasized.

That is, in the color interpolation processing as described above, since an LPF effect to emphasize a low spatial frequency component occurs as well as the predictive interpolation effect for missing color information, the edge part of the image becomes dull and the high spatial frequency component is reduced. Therefore, the high spatial frequency component of the dulled image is emphasized by the HPF of the contour emphasizing unit 50, thereby sharpening the luminance image.

On the other hand, the color-difference signal (C) is sent to the false color reduction processing unit 60, where the processing to reduce or eliminate a false color generated by the color interpolation processing is performed (step S107).

Figure 7:
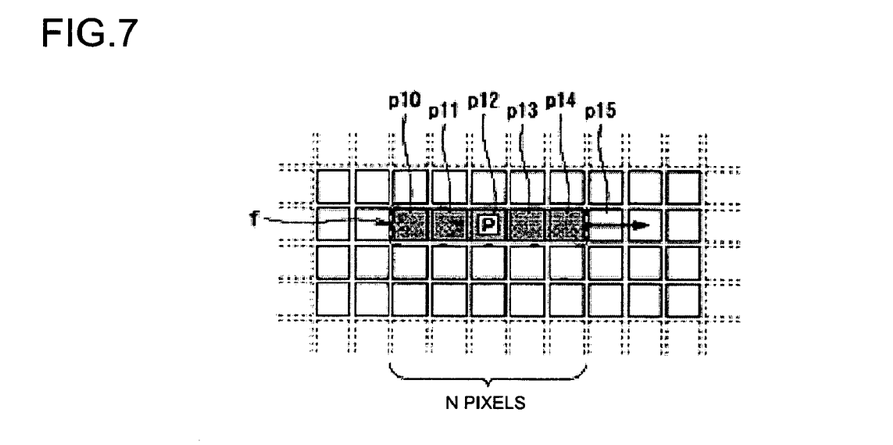
FIG. 7 is a conceptual view showing a state where a group of pixels including a target pixel is selected by a row filter.

In this false color reduction processing, a row filter (one-dimensional filter) f for selecting N pixels (in this embodiment, five pixels "p10" to "p14") that are continuous in the row direction (or line) including a target pixel "P" (p12) as a processing target is used, as shown in FIG. 7, and the pixel value of the target pixel P is determined from the pixel values that remain when maximum and minimum pixel values having large absolute values of the color-difference signal (C) are excluded from the pixel values "p10" to "p14" selected by the row filter f.

That is, in this image processing method, it is assumed that the pixel value of a pixel that generates a false color has a greater degree of coloring than the pixel values of the peripheral pixels, and in order to eliminate the pixels having a high rate of coloring, the maximum and minimum pixel values are excluded from the group of N pixels that are continuous in the row direction including the target pixel P.

Since it can be judged that the rate of coloring increases fundamentally in proportion to the absolute value of the value of the color-difference signal (C), the pixel value is determined from the value of the color-difference signal (C) acquired by the YC conversion of the image data after the color interpolation processing into the luminance and color-difference signals.

Figure 8:
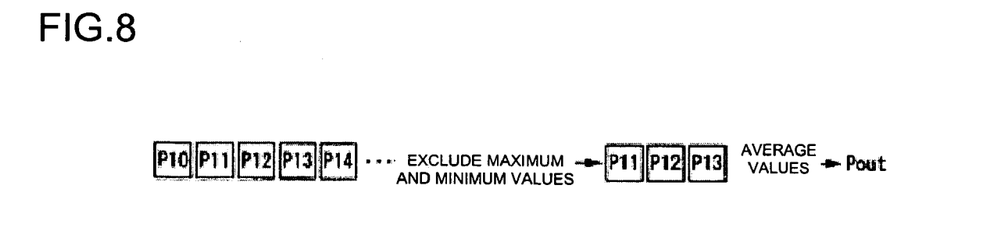
FIG. 8 is a view showing a specific example of determining the pixel value of the target pixel from the pixel values of the selected pixels.

Therefore, if the five pixels "p10" to "p14" including the target pixel P as a processing target are selected by the row filter f extending in the row direction as shown in FIG. 7 and, for example, the pixel "p10" has the maximum pixel value among them and the pixel "p14" has the minimum pixel value, the pixel value of the target pixel P is determined from the pixel values of the pixels "p11", "p12" and "p13" that remain when these pixels "p10" and "p14" are excluded, as shown in FIG. 8.

As a technique for determining the pixel value of the target pixel P in this case, it is appropriate to employ the average value of the pixel values of the pixels "p11", "p12" and "p13" as shown in FIG. 8, but the median of these pixel values may also be employed. Since the color-difference signal consists of two signals Cb and Cr, each of Cb and Cr is processed totally independently.

Figure 9:
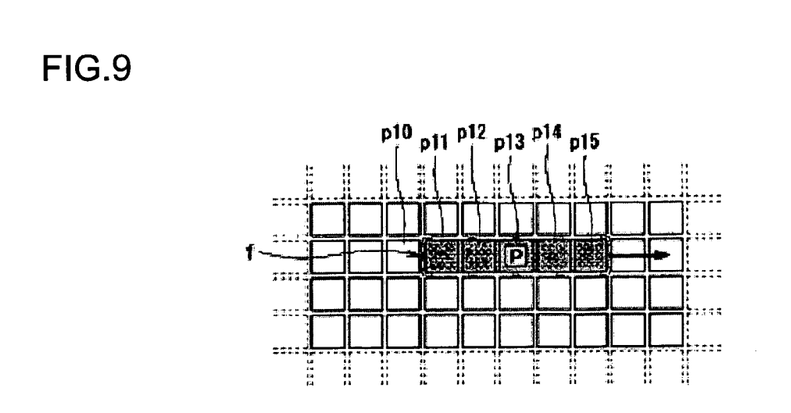
FIG. 9 is a conceptual view showing a state where a group of pixels including the next target pixel is selected by the row filter.
Figure 10:
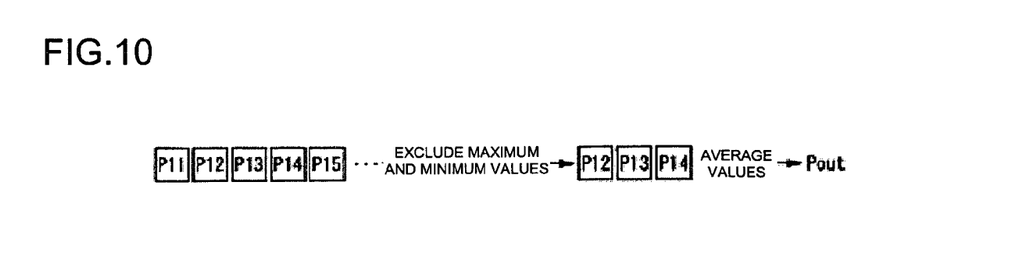
FIG. 10 is a view showing a specific example of determining the pixel value of the target pixel from the pixel values of the selected pixels.

When the processing on the one target pixel P is finished in this manner, the row filter f is shifted to the right by one pixel so as to select pixels around a target pixel P next to the previous target pixel, as the next processing target pixel, as shown in FIG. 9, and similar processing is performed on this target pixel P. That is, when the target pixel P as the processing target pixel shifts to the next pixel, the target pixel P is the pixel "p13" and five pixels including this pixel and two pixels each on both sides of the target pixel ("p11", "p12", "p13", "p14") are selected, as shown in FIG. 9. Then, for example, if the pixels "p11" and "p15" have the maximum and minimum pixel values, respectively, among these five pixels, the pixel value of this next target pixel P is determined from the pixel values of the pixels "p12", "p13" and "p14" that remain when these pixels "p11" and "p15" are excluded, as shown in FIG. 10.

By performing such processing sequentially on all the pixels or in parallel on plural areas obtained by dividing the pixels, it is possible to easily and effectively eliminate all the false colors generated at the edge part of the luminance image by the color interpolation processing.

The target pixel P selected by this row filter f need not necessarily be situated at the center of the row filter f as long as it is selected by the row filter f. However, if the pixel situated at the center of this row filter f is selected as the target pixel, uniform false color reduction processing can be performed in relation with the pixel values of the peripheral pixels.

The number of pixels N selected simultaneously by this row filter f is not particularly limited as long as it is at least four or more. That is, if the number of pixels N is three, only one pixel value remains when the minimum and maximum values are excluded, and the effect of eliminating a false color, which is an object of this invention, may not be properly achieved even though the effect of eliminating spike-like noise as in a median filter is achieved. In consideration of the load on the computer system necessary for the processing and the effects, the optimum number of pixels is five.

Next, FIGS. 11 to 15 show other embodiments related to such a false color reduction processing technique according to this invention.

First, in FIGS. 11 to 14, instead of the above-described row filter f, a matrix filter (two-dimensional filter) F having M rows including the row filter f (N×M) is used. This enables effective elimination of a false color generated continuously particularly in the vertical direction.

Figure 11:
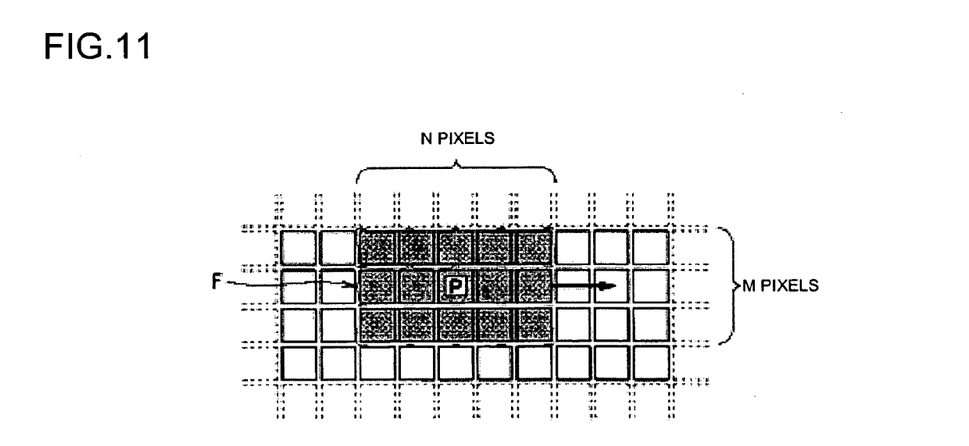
FIG. 11 is a conceptual view showing a state where a group of pixels including a target pixel is selected by a matrix filter.

That is, in the image processing methods according to the above-described inventions 1 and 2, the one row filter f along the typical scanning direction is used for performing the false color reduction processing, whereas in this embodiment, the matrix filter (5×3) F including the vertically stacked plural row filters f in M rows (in this embodiment, three rows) is used for carrying out the false color reduction processing on each target pixel P, as shown in FIG. 11.

Figure 12:
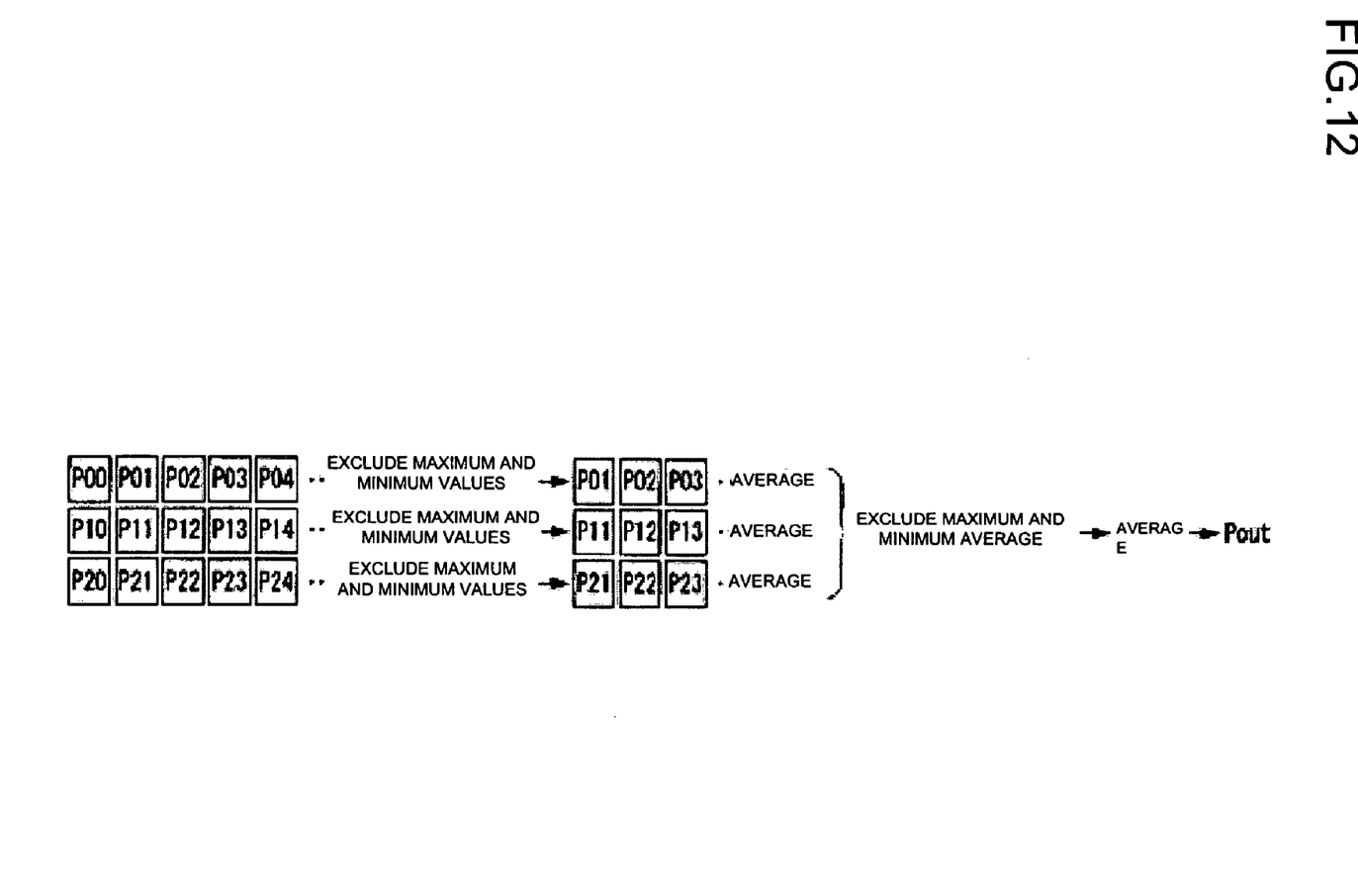
FIG. 12 is a view showing a specific example of determining the pixel value of the target pixel from the pixel values of the selected pixels.

For example, if the target pixel P as a processing target is a pixel "p12", as shown in FIGS. 11 and 12, this pixel "p12" at the center and its peripheral pixels "p00", "p01", "p02", "p03", "p04", "p10", "p11", "p13", "p14", "p20", "p21", "p22", "p23", "p24" are collectively selected, and then the average value in each row from which the maximum and minimum values are excluded (for example, the average value of "p01", "p02" and "p03" in the first row, the average value of "p11", "p12" and "p13" in the second row, and the average value of "p21", "p22" and "p23" in the third row) is calculated. Then, the average value of the average values in the individual rows from which the maximum and minimum average values are excluded is employed as the pixel value of the target pixel P. In this embodiment, as shown in FIGS. 11 and 12, since the number of row "M" is three, only one average value remains when the maximum and minimum average values are excluded and therefore this values is directly employed as the pixel value of the target pixel P.

Figure 13:
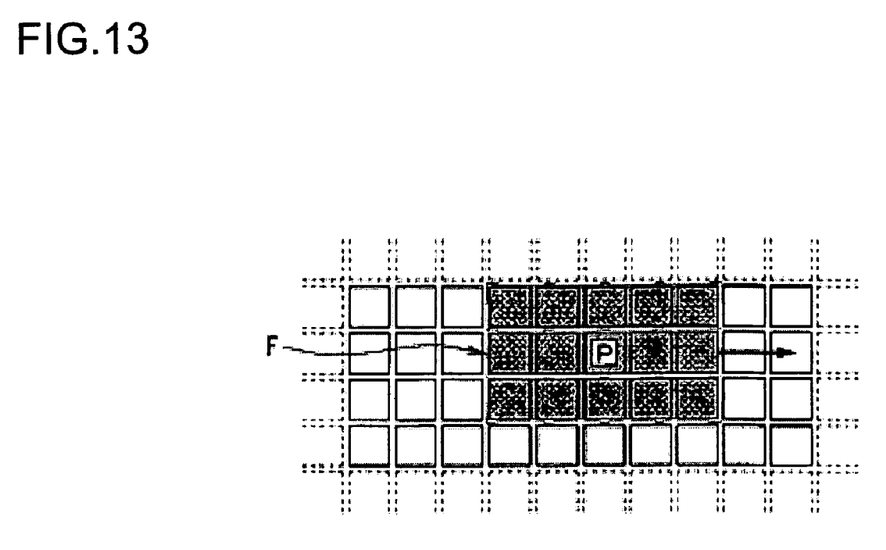
FIG. 13 is a conceptual view showing a state where a group of pixels including a target pixel is selected by the matrix filter.
Figure 14:
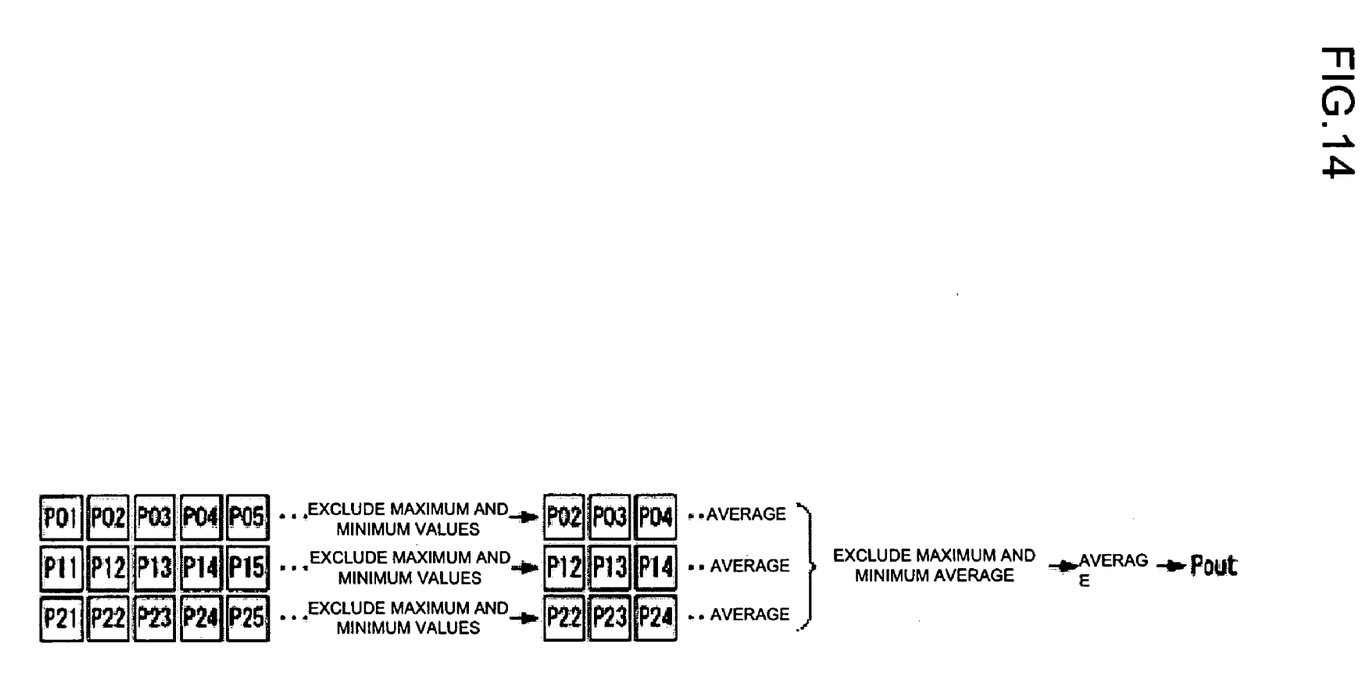
FIG. 14 is a view showing a specific example of determining the pixel value of the target pixel from the pixel values of the selected pixels.

When such false color reduction processing on the target pixel P is finished, this matrix filter F is shifted to the right by one pixel to carry out similar false color reduction processing on the next target pixel P, as shown in FIGS. 13 and 14.

That is, when the target pixel P as a processing target is shifted to the pixel "p13", as shown in FIGS. 13 and 14, this pixel "p13" at the center and its peripheral pixels "p01", "p02", "p03", "p04", "p05", "p11", "p12", "p14", "p15", "p21", "p22", "p23", "p24", "p25" are collectively selected, and then the average value in each row from which the maximum and minimum values are excluded (for example, the average value of "p02", "p03" and "p04" in the first row, the average value of "p12", "p13" and "p14" in the second row, and the average value of "p22", "p23" and "p24" in the third row) is calculated. Then, the average value of the average values in the individual rows from which the maximum and minimum average values are excluded is employed as the pixel value of the target pixel P.

By performing such processing sequentially on all the pixels or in parallel on plural areas obtained by dividing the pixels, it is possible to effectively eliminate a false color generated at the edge part, particularly in the vertical direction, by the color interpolation processing.

The number of rows in this matrix filter F is not particularly limited as long as it is three or more. However, in consideration of the load on the computer system necessary for the processing and the effects, the appropriate number of rows is three. If the computer system allows a margin for processing load, it is preferred that the number of rows is five. Also, it is preferred that the target pixel P is selected at the center, as in the case of using the row filter f.

Figure 15:
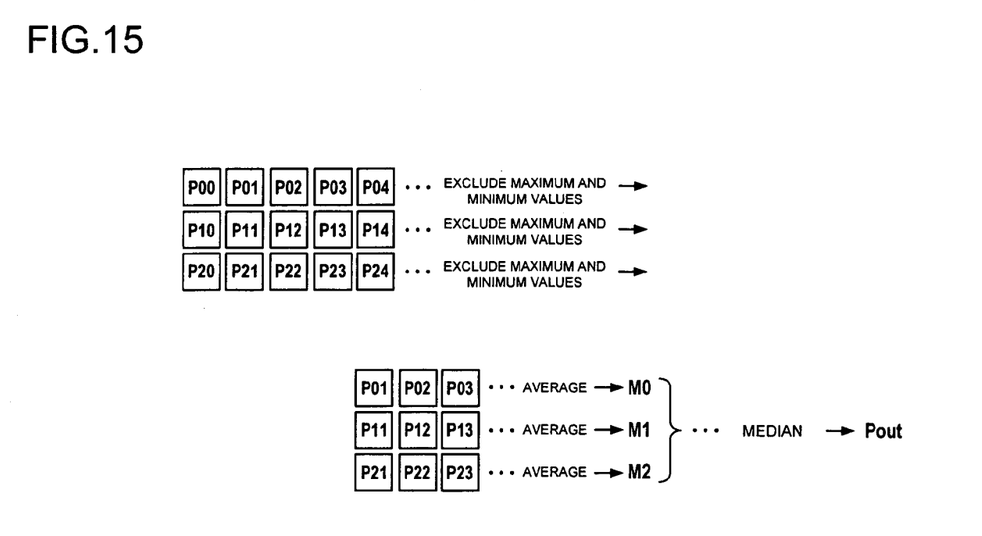
FIG. 15 is a view showing a specific example of determining the pixel value of the target pixel from the pixel values of the selected pixels.

Next, FIG. 15 shows an embodiment in which the median of the average values in the individual rows found from the remaining pixel values when the maximum and minimum values are excluded from the pixel values in each row selected by the above-described matrix filter F is employed as the pixel value of the target pixel.

That is, if the target pixel P as a processing target is a pixel "p12", as shown in FIG. 15, this pixel "p12" at the center and its peripheral pixels "p00", "p01", "p02", "p03", "p04", "p10", "p11", "p13", "p14", "p20", "p21", "p22", "p23", "p24" are collectively selected, and then the average values "M0", "M1" and "M2" in the individual rows consisting of nine pixels from which the maximum and minimum values are excluded from each row (for example, the average value of "p01", "p02" and "p03" in the first row, the average value of "p11", "p12" and "p13" in the second row, and the average value of "p21", "p22" and "p23" in the third row) are calculated. Then, if the average values are in the relation of "M0">"M2">"M1", the pixel value "M2", which is the median of these, is employed as the pixel value of the target pixel P.

In short, in the above-described embodiment, while it is possible to eliminate a false color generated continuously in the vertical direction by eliminating a false color generated in each line, it is difficult to effectively eliminate a false color generated continuously in the horizontal direction.

Generally, since this false color generated in the vertical direction is often more visible than the false color generated in the horizontal direction, the image quality can be efficiently improved mainly by eliminating the false color generated in the vertical direction.

However, since the image cannot be improved further if the false color generated in the horizontal direction is left as it is, the false color generated in the horizontal direction, too, must be eliminated. By employing the processing technique according to this embodiment, it is possible to effectively eliminate the false color generated continuously in the horizontal direction.

Therefore, if the processing to eliminate a false color continuous in the horizontal direction as described in this embodiment is performed in addition to the processing to eliminate a false color continuous in the vertical direction as described in the above-described embodiment, most of false colors generated in the vertical and horizontal directions can be eliminated or the occurrence of such false colors can be dramatically reduced to achieve significant improvement in the image quality.

When such false color reduction processing on the color-difference signal (C) is finished, the processing data is sent to the RGB converter unit 70 together with the processed luminance signal (Y), as shown in FIG. 3. After these signals are converted back to an RGB signal by this RGB converter unit 70, the RGB signal is sent to the image output unit 80 and the image is visually displayed to a user or the like.

In this manner, according to this invention, image data in which a false color is generated by the color interpolation processing is converted to a luminance signal and a color-difference signal, and the false color reduction processing is performed on the color-difference signal by using the row filter f or the matrix filter F as described above. Therefore, a false color generated at an edge part that causes deterioration of an image can be effectively reduced or eliminated, and consequently, a high-quantity image having no false color can be acquired easily and securely.

When performing the false color reduction processing using the row filter f or the matrix filter F as described above, if the target pixel P is situated at an edge part of an image and therefore its peripheral pixels are lacking, similar false color reduction processing may be performed on the pixel at that position by arranging dummy pixels around the target pixel or utilizing a margin or the like, as in the conventional filtering processing.

The false color reduction processing as described above may be uniformly performed on all the pixels. However, a false color caused by the color interpolation processing is generated mostly at an edge part where the density changes largely, as described above. Therefore, by detecting an edge part of a processing target image in advance by using a differential-type edge detection operator, template-type edge detection operator or the like, for example, "Sobel", "Perewitt", "Roberts" or the like, and performing the false reduction processing according to this invention at and around the edge part, the time required for the processing may be reduced than in the case of performing the processing on all the pixels.

In the flow of this processing, if an HPF is used for contour emphasis of the luminance Y, the edge may be determined from the luminance signal. At the same time, since the structure of the HPF is almost equivalent to that of the edge detection filter, an operation equivalent to that of the edge detection filter can be realized by a signal from the HPF. Alternatively, an HPF output may be generated by adding the value of the target pixel using the edge detection filter instead of the HPF.

If such edge detection is carried out and the false color reduction processing is performed, a significant effect can be expected particularly for an image having a low spatial frequency (little change in density).

As a filter that exhibits a false color avoidance effect as described above, a 3×3 (pixel) median filter is known.

This median filter can exhibit an excellent noise elimination effect on spike-like noise generated in an image. Therefore, a certain effect can be expected on a false color generated scatteringly like spikes.

However, a false color generated by the color interpolation processing occurs mainly at an edge part, as described above, and the area where it occurs is not limited to one row of pixels or one column of pixels. In an area where the edge rises extensively, a false color occurs in a broad range.

The conventional median filter cannot exhibit a satisfactory effect on such a false color. However, by performing the processing as described above using the matrix filter F in which plural column filters f are arrayed, as in this invention, it is possible to effectively eliminate even such a false color generated in a broad range.

Figure 16:
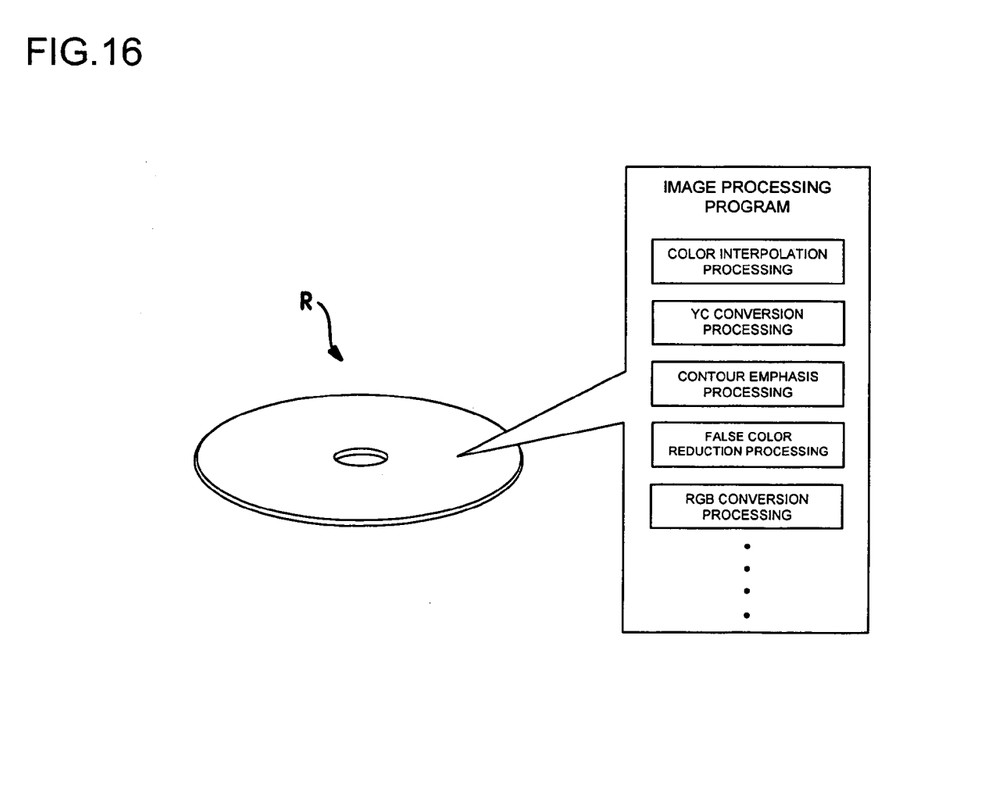
FIG. 16 is a view showing an example of recording medium R on which an image processing program according to this invention is recorded.

Also, this invention can be realized on software by using hardware such as a personal computer. The software can be easily provided to a user who wants to have it, through a recording medium R such as a CD on which the image processing program is recorded or through a network such as the Internet, as shown in FIG. 16.

Moreover, if the primary units of the image processing apparatus 100 such as the color interpolation processing unit 30, the YC converter unit 40, the contour emphasizing unit 50, the false color reduction processing unit 60, the RGB converter unit 70 and the image output unit 80 are realized as a semiconductor device such as a small-sized integrated circuit like an IC or LSI, it can be easily mounted on a portable small camera such as a digital camera or digital video camera and can be used for a part of the image processing.

While the present invention has been described with reference to preferred embodiments, it should be understood that various changes and modifications to the embodiments may be made without departing from the scope and spirit of the claims.

What is claimed is:

1. An image processing program stored in a tangible computer-readable medium that is executed by a processor after performing color interpolation processing on image data, the image processing program comprising:
    converting the image data on which the color interpolation processing has been performed to a luminance signal and a color-difference signal; and
    executing false color reduction processing on the color-difference signal,
    wherein the false color reduction processing includes:
        selecting plural pixels including a target pixel by a two-dimensional filter that includes M one-dimensional filters, each for selecting N pixels that are continuous in a first direction, the M one-dimensional filters being arrayed in a direction orthogonal to the first direction, wherein M is greater than or equal to 3 and N is greater than or equal to 4;
        separately for each of the M one-dimensional filters,
            identifying a first pixel of the selected N pixels having a maximum value and a second pixel of the selected N pixels having a minimum value;
            removing the first and second pixels from the selected N pixels
            calculating an average value from remaining ones of the selected N pixels; and
        determining a pixel value of the target pixel based on an average of the average values of the M one-dimensional filters.

2. The image processing program as claimed in claim 1, wherein the pixel value of the target pixel is determined from average values, for each of the M one-dimensional filters, of the remaining ones of the selected N pixels.

3. The image processing program as claimed in claim 1, wherein the pixel value of the target pixel is determined from an average value of average values, for each of the M one-dimensional filters, of the remaining ones of the selected N pixels.

4. The image processing program as claimed in claim 2, wherein the pixel value of the target pixel comprises a median of the average values.

5. The image processing program as claimed in claim 1, wherein the target pixel comprises a pixel situated at the center of the two-dimensional filter.

6. The image processing program as claimed in claim 1, wherein the false color reduction processing is carried out about an edge part of the image data.

7. The image processing program as claimed in claim 1, wherein the image data is acquired by a single-plate type color image pickup sensor.

8. An image processing apparatus for performing predetermined image processing on an image taken in by a color image pickup sensor and outputting the resulting image, comprising:
- a color interpolation processing unit that carries out color interpolation processing on the image taken in by the image pickup sensor;
- a YC converter unit that converts the image data on which the color interpolation processing has been performed by the color interpolation processing unit to a luminance signal and a color-difference signal;
- a false color reduction processing unit that selects, by a two-dimensional filter, plural pixels including a target pixel with respect to the color-difference signal acquired by the conversion by the YC converter unit, wherein the two-dimensional filter includes M one-dimensional filters, each for selecting N pixels that are continuous in a first direction, the M one-dimensional filters being arrayed in a direction orthogonal to the first direction, wherein M is greater than or equal to 3 and N is greater than or equal to 4,
- wherein the false color reduction processing unit, separately for each of the M one-dimensional filters,
  - identifies a first pixel of the selected N pixels having a maximum value and a second pixel of the selected N pixels having a minimum value,
  - removes the first and second pixels from the selected N pixels, and
  - calculates an average value from remaining ones of the selected N pixels, and
- wherein the false color reduction processing unit determines a pixel value of the target pixel based on an average of the average values of the M one-dimensional filters; and
- an RGB converter unit that combines the color-difference signal processed by the false color reduction processing unit and the luminance signal, that performs RGB conversion, and that sends the resulting image data to an image output unit.

9. A semiconductor device for performing predetermined image processing on an image taken in by a color image pickup sensor and outputting the resulting image, comprising:
- a color interpolation processing unit that carries out color interpolation processing on the image taken in by the image pickup sensor;
- a YC converter unit that converts the image data on which the color interpolation processing has been performed by the color interpolation processing unit to a luminance signal and a color-difference signal;
- a false color reduction processing unit that selects, by a two-dimensional filter, plural pixels including a target pixel with respect to the color-difference signal acquired by the conversion by the YC converter unit, wherein the two-dimensional filter includes M one-dimensional filters, each for selecting N pixels that are continuous in a first direction, the M one-dimensional filters being arrayed in a direction orthogonal to the first direction, wherein M is greater than or equal to 3 and N is greater than or equal to 4,
- wherein the false color reduction processing unit, separately for each of the M one-dimensional filters,
  - identifies a first pixel of the selected N pixels having a maximum value and a second pixel of the selected N pixels having a minimum value,
  - removes the first and second pixels from the selected N pixels, and
  - calculates an average value from remaining ones of the selected N pixels, and
- wherein the false color reduction processing unit determines a pixel value of the target pixel based on an average of the average values of the M one-dimensional filters; and
- an RGB converter unit that combines the color-difference signal processed by the false color reduction processing unit and the luminance signal, that performs RGB conversion, and that sends the resulting image data to an image output unit.

10. The image processing apparatus as claimed in claim 8, wherein the target pixel comprises a pixel situated at the center of the two-dimensional filter.

11. The image processing apparatus as claimed in claim 8, wherein the false color reduction processing unit operates on an edge part of the image data.

12. The image processing apparatus as claimed in claim 8, wherein the color image pickup sensor comprises a single-plate type color image pickup sensor.

* * * * *